United States Patent
Wu et al.

(10) Patent No.: US 11,181,969 B2
(45) Date of Patent: Nov. 23, 2021

(54) METHOD AND SYSTEM FOR GRAPHICS PROCESSOR UNIT BUSY STATE DETECTION

(71) Applicant: Dell Products, LP, Round Rock, TX (US)

(72) Inventors: Chung S. Wu, Taipei (TW); Kurt D. Gillespie, Round Rock, TX (US); Thomas A. Shows, Leander, TX (US); Adolfo S. Montero, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 289 days.

(21) Appl. No.: 16/373,264

(22) Filed: Apr. 2, 2019

(65) Prior Publication Data

US 2020/0319700 A1 Oct. 8, 2020

(51) Int. Cl.
 *G06F 1/32* (2019.01)
 *G06F 1/3296* (2019.01)
 *G06T 1/20* (2006.01)

(52) U.S. Cl.
 CPC .............. *G06F 1/3296* (2013.01); *G06T 1/20* (2013.01)

(58) Field of Classification Search
 None
 See application file for complete search history.

(56) References Cited

U.S. PATENT DOCUMENTS

| | | | |
|---|---|---|---|
| 8,862,909 B2* | 10/2014 | Branover | G06F 1/00 713/300 |
| 2007/0206018 A1* | 9/2007 | Bajic | G09G 5/363 345/501 |
| 2014/0143565 A1* | 5/2014 | Paul | G06F 1/206 713/320 |
| 2015/0317762 A1* | 11/2015 | Park | G06F 1/3206 345/505 |
| 2015/0355692 A1* | 12/2015 | Paul | G06F 1/3206 713/322 |

* cited by examiner

*Primary Examiner* — Fahmida Rahman
(74) *Attorney, Agent, or Firm* — Prol Intellectual Property Law, PLLC; H. Kenneth Prol

(57) ABSTRACT

An information handling system includes a graphics processing unit and an embedded controller. The embedded controller is communicatively coupled to the graphics processing unit, and executes instructions to perform one or more operations. The embedded controller to set an active count associated with a graphics processing unit to a predetermined value. The embedded controller to monitor an active pin of the graphics processing unit. The embedded controller to receive the temperature of the graphics processing unit from the temperature sensor. In response to the determination that the temperature of the graphics processing unit satisfies a first temperature threshold: the embedded controller to change a state in a power state table to a high power state based on the temperature of the graphics process unit and the active count, wherein the state of the power state table is associated with a central processing unit of the information handling system.

20 Claims, 5 Drawing Sheets

METHOD AND SYSTEM FOR GRAPHICS PROCESSOR UNIT BUSY STATE DETECTION

FIELD OF THE DISCLOSURE

The present disclosure generally relates to detecting a busy state of a graphics processing unit for an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
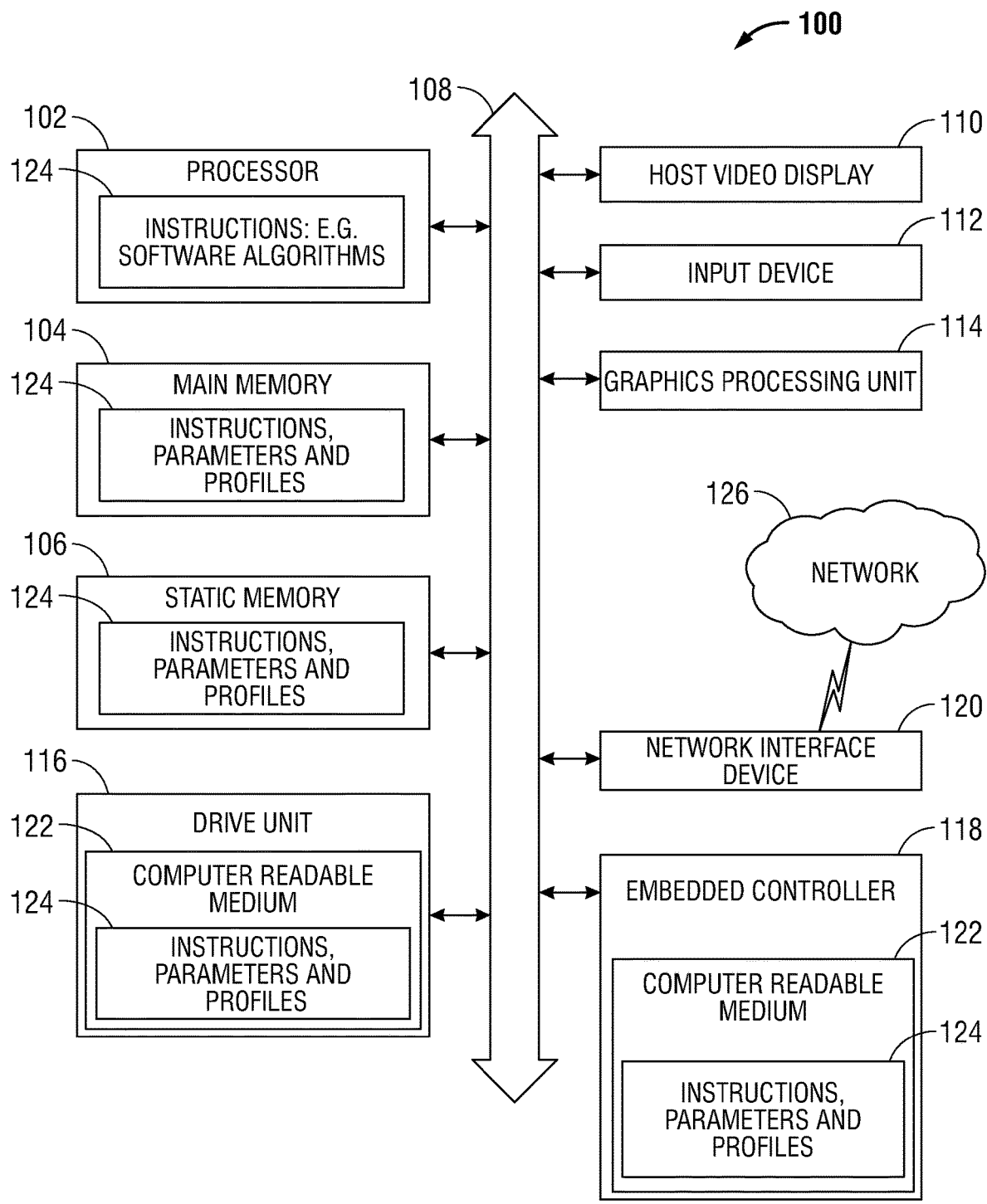
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Systems and methods for detecting a busy state of a graphics processing unit are disclosed herein. Upon start-up, the system may set an active count of a graphics processing unit to a predetermined value. The system may monitor an active pin of the graphics processing unit, and modify the active count based on whether an active signal is present on the active pin. In an embodiment, the active count represents an amount of activity (based on detection of an active signal) of the graphics processing unit during a predetermined interval or time period. In an example, the active count is utilized to determine whether an activity level of the graphics processing unit satisfies a threshold during the predetermined interval, such that a processor may be placed in a high power state to increase performance of the graphics processing unit as will be described herein. The system may also measure a temperature of the graphics processing unit. In response to determining that the temperature of the graphics processing unit satisfies a first temperature threshold, the system may change a state in a power state table to a high power state based on the temperature of the graphics process unit and the active count. In an example, the state of the power state table is associated with a central processing unit of the information handling system. In an embodiment, during time periods of inactivity within the graphics processing unit, an inactive count is incremented to represent an amount of inactivity of the graphics processing unit during a particular time period. In an example, the inactive count is utilized to determine whether a current period of inactivity in the graphics processing unit satisfies a threshold level of inactivity, such that a processor may be placed in a low power state to provide power savings within the information handling system as will be described herein.

These systems and methods provide various advantages and benefits over other systems implementing graphics processing unit state detection. In particular, the systems disclosed herein utilize a combination of a measured temperature of a graphics processing unit and an active/inactive indication on an active pin of the graphics processing unit to detect a busy state of the graphics processing unit. This combination of temperature and active/inactive indication may eliminate false positive detections of an active state of the graphics processing unit as compared to systems that may only monitor the active pin of the graphics processing unit to detect a state of the graphics processing unit. For example, while a detection of an active signal provided on the active pin of the graphics processing unit may indicate that the graphics processing unit is active at that particular point in time, the active signal may not indicate that a modification of a power state table may help the performance of the graphics processing unit. For instance, the graphics processing unit may only be active for a brief period of time, with a low average of utilization, and in this instance it would best to avoid modification of the power state stable. Additionally, the systems disclosed herein may implement a busy state detection with a hysteresis between a first temperature threshold and a second temperature threshold to increase the accuracy of the system to place a processor in a proper power state based on the state of the graphics processing unit. The system placing the processor in the proper power state may improve the performance of the graphics processing unit while saving battery life of the system, reducing acoustic noise, and reducing thermal conditions within the system as will be described herein.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include an input device 112, such as a keyboard, and/or a cursor control device, such as a mouse, touchpad, or gesture or touch screen input. Additionally, the information handling system 100 may include a graphics processing unit (GPU) 114. The information handling system 100 can also include a disk drive unit 116.

The information handling system 100 may also include an embedded controller 118 that may be operably connected to the bus 108. The embedded controller 118 computer readable medium 122 may also contain space for data storage. The embedded controller 118 may perform tasks related to determining a busy state of the graphics processing unit 114. In an embodiment, the embedded controller 118 may communicate with the main memory 104, the processor 102, the alpha-numeric input device 112, and the network interface device 120 via bus 108, and several forms of communication may be used, including ACPI, SMBus, a 24 MHZ BFSK-coded transmission channel, or shared memory.

A wireless adapter shown as the network interface device 120 can provide connectivity to a network 126, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may also provide connectivity via Bluetooth to a nearby information handling system, such as a desktop or laptop information handling system, or to a tablet or mobile device. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The information handling system 100 can include a set of instructions 124 that can be executed to cause the computer system to perform any one or more of the methods or computer based functions disclosed herein. For example, instructions 124 may be executed by the embedded controller 118, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the embedded controller 118 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a power state table. The disk drive unit 116 and static memory 106 also contain space for data storage. Further, the instructions 124 may embody one or more of the methods or logic as described herein. For example, instructions relating to the embedded controller 118 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The embedded controller 118 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
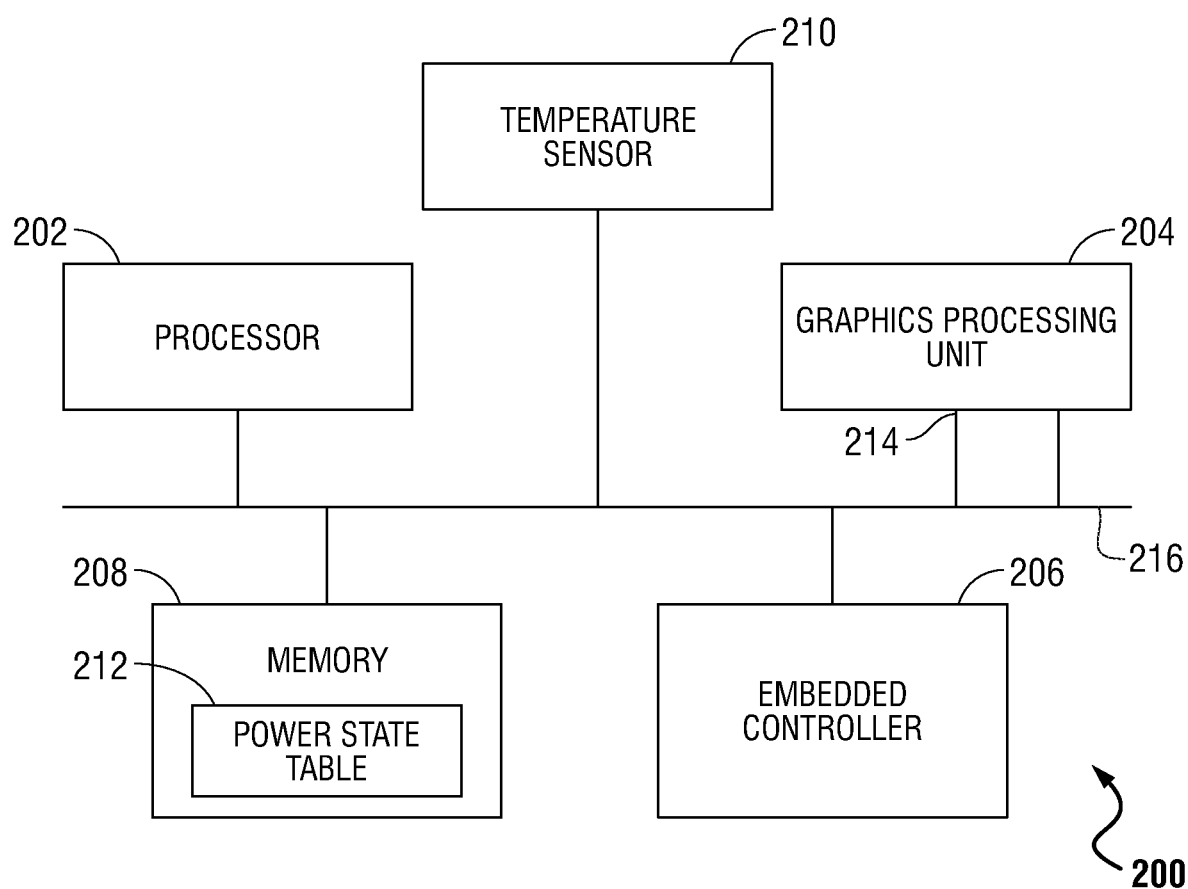
FIG. 2 is a block diagram illustrating an information handling system according to an embodiment of the present disclosure.

FIG. 2 illustrates an information handling system 200 according to an aspect of the present disclosure. The information handling system 200 includes a processor 202, a graphics processing unit 204, an embedded controller 206, a memory 208, and a temperature sensor 210. Information handling system 200 can also include one or more buses 216 operable to transmit communications between the various hardware components. In an embodiment, the graphics processing unit 204 may be a discrete graphics processing unit, such that it is not integrated within another processor of information handling system 200. In other embodiments, the graphics processing unit 204 may be an integrated graphics processing unit with a processor 202 such as a CPU of information handling system 200. In an example, processor 202 may be similar to processor 102 of FIG. 1, graphics processing unit 204 may be similar to graphics processing unit 114 of FIG. 1, and embedded controller 206 may be similar to embedded controller 118. In an embodiment, embedded controller 206 may execute instructions of dedicated firmware, which may cause embedded controller 206 to perform one or more of the operations described herein. In an embodiment, memory 208 may contain space for data storage and may include any type of memory, such as the memory described above for memories 104 and 106 of FIG. 1. Memory 208 may be similar to main memory 104 or static memory 106 of FIG. 1, and may store any data for use by another component within information handling system 200. In certain examples, memory 208 may store a power state table 212 or C-state table for processor 202.

In an example, power state table 212 may include a power state for processor 202, and the power state may be in suitable power state. For example, power states of processor 202 may include, but are not limited to, a C0 state that is an active or operational state where processor 202 is doing useful work, a C1 state that is a first idle state or an auto halt state where a clock of processor 202 is gated to prevent execution, a C2 state that is a second idle state or a restrict use state where an input/output (I/O) controller hub clocks interrupts to processor 202, a C3 state that is a stop clock state, a C4 state that is a deep sleep state, a C5 state that is a voltage cut state, a C6 state that is a power down state, and additional C7-C10 states that each include a deep sleep state of processor 202 with more blocks in a package being turned off. As will be described herein, embedded controller 206 may modify the power state table of the processor 202, such that the possible power sates may be limited to either high power states or low power states, based on whether graphics processing unit 204 is in a busy state or not in a busy state. In certain examples, the high power states may be power states that may decrease an amount of wake-up time for processor 202, which in turn may increase the performance of graphics processing unit 204 during the busy state. The high power state may one of a predefined group of power states including, but not limited to, the C0 or active state and the C1 or auto halt state. In response to a detection that graphics processing unit 204 is not in a busy state, embedded controller 206 may change a power state of processor 202 to a lower power state. In an example, the low power state may be any power state including, but not limited to, one of the C7-C10 deep sleep states: a stop clock state, a deep sleep state, a voltage cut state, and a power down state. In an embodiment, changing the power state of processor 202 to low power state may decrease power consumption by processor 202, which in turn may increase battery life of information handling system 200 while graphics processing unit 204 is not in a busy state.

In an example, graphics processing unit 204 may perform one or more operations to render images for display, and provide the rendered images to a display device, such as video display 110 of FIG. 1, for display to an individual. During operation, graphics processing unit 204 may have periods of activity and periods of inactivity. While graphics processing unit 204 is actively processing data and rendering images, graphics processing unit 204 may provide a signal on an active pin 214 of graphics processing unit 204 to indicate an active state of graphics processing unit 204. As will be described herein, the signal provided on active pin 214 may be utilized to determine whether graphics processing unit 204 is in a busy state.

Temperature sensor 210 may be located within information handling system 200 within a predefined proximity of graphics processing unit 204. For example, temperature sensor 210 may be located near graphics processing unit 204, located within physical communication with graphics processing unit 204, or the like. In an embodiment, the proximity of temperature sensor 210 to graphics processing unit 204 may enable temperature sensor 210 to measure a temperature of with graphics processing unit 204, and embedded controller 206 may utilize, in any suitable manner, the temperature measured by temperature sensor 210 to determine a busy state of graphics processing unit 204 as will be described herein.

During start-up of information handling system 200, state table 212 may include any of the possible power states provided above. In an embodiment, during system power change of information handling system 200, the state for processor 202 may be set to a default power state within power state table 214. Additionally, embedded controller 206 may set an active count for graphics processing unit 204 to zero. In an example, the active count may be a value representative of a number of active cycles within graphics processing unit 204. In an embodiment, a count of active cycles may be a number of intervals of a configurable time when a determination was made that the graphics processing unit 204 was active. In an example, the system power change may include, but is not limited to, a system boot, a system resume operation, removal of alternating current (AC) power from the system, sleep being requested, and AC power being inserted to the system.

In an embodiment, in response to a system power change, any suitable device may periodically check if the temperature associated with graphics processing unit 204 satisfies a first temperature threshold (e.g., the measured temperature is greater than or equal to the first temperature threshold). In an example, each interval of the periodic check may be performed based any suitable condition triggering the check, such as an expiration of a timer set to a programmable amount of time. In certain examples, temperature sensor 210 and embedded controller 206 may combine in any suitable manner to compare the temperature of graphics processing unit 204 with the first temperature threshold. In an embodiment, temperature sensor 210 may periodically both measure the temperature and compare the measured temperature to the first threshold. In this embodiment, based on each comparison at the periodic interval, temperature sensor 210 may provide a signal indicating whether the measured temperature satisfies the first temperature threshold to embedded controller 206. In another embodiment, temperature sensor 210 may periodically measure the temperature associated with graphics processing unit 204 and provide the measured temperature to embedded controller 206. In this embodiment, in response to receiving the measured temperature, embedded controller 206 may compare the measured temperature to the first temperature threshold. In both embodiments, if the measured temperature does not satisfy the first temperature threshold, embedded controller 206 may set the active count to zero and the periodic checking of the temperate may repeat. In an embodiment, a delay between checking the temperature of graphics processing unit 204 may be any programmable value including, but not limited to, 0.4 seconds, 0.5 seconds, and 0.6 seconds.

Based on the temperature of graphics processing unit 204 satisfying the first temperature threshold, a signal on active pin 214 may be monitored to determine an indication of whether graphics processing unit 204 is active and one or more operations may be performed based on the signal. In an embodiment, the monitoring of the signal on active pin 214 may be performed in any suitable manner. For example, embedded controller 206 may access active pin 214 via one or more buses 216 of information handling system 200. In an embodiment, embedded controller 206 may utilize the determination of the active or inactive indication of signal provided on active pin 214 in combination with the determination that the measured temperature satisfies the first temperature threshold to correlate that the heat detected by temperature sensor 210 is associated with graphics processing unit 204.

Embedded controller 206 may perform one or more operations based on monitoring active pin 214. For example, if embedded controller 206 determines that active pin 214 indicates that graphics processing unit 204 is inactive, the active count of graphics processing unit 204 is reset to zero and the periodic check of the temperature is also reset. In an example, an indication that graphics processing unit 204 is inactive may be provided in any suitable manner including, but not limited to, a signal representing inactivity by graphics processing unit 204 and an absence of a signal on active pin 214. In response to embedded controller 206 detecting, via active pin 214, that graphics processing unit 204 is active, embedded controller 206 may increment the active count.

In an embodiment, based on graphics processing unit 204 being active and the active count being incremented, the active count may be compared to a count threshold in any suitable manner. For example, embedded controller 206 may access the count threshold and compare the current active count for graphics processing unit 204 with the count threshold. In an example, embedded controller 206 may access the count threshold from any suitable location including, but not limited to, memory 208 and embedded controller computer readable medium similar to the embedded controller 118 computer readable medium 122 of FIG. 1.

In an example, embedded controller 206 may perform one or more operations based on the comparison of the active count with the count threshold. In an example, in response to the active count not satisfying (e.g., being less than) the count threshold, embedded controller may recheck active pin 214 of graphics processing unit 204 at periodic intervals. In an embodiment, a delay between checking the active pin 214 of graphics processing unit 204 may be any programmable value including, but not limited to, 0.4 seconds, 0.5 seconds, and 0.6 seconds. If active pin 214 indicates that the graphics processing unit 204 is active, embedded controller 206 may increment the active count and compare the active count with the count threshold. In an example, in response to the active count satisfying (e.g., being greater than or equal to) the count threshold, embedded controller 206 may detect a busy state of graphics processing unit 204 and change or modify power state table 212 to set the power state of processor 202 to a high power state. In an embodiment, the high power state may one of a predefined group of power states including, but not limited to, the active state and the auto halt state. In another embodiment, the predefined group of power states may include the active state, the auto halt state, the restrict use state, and the stop clock state. In an embodiment, changing the power state of processor 202 to a high power state may decrease an amount of wake-up time for processor 202, which in turn may increase the performance of graphics processing unit 204 during the busy state. If the power state of processor 202 was not limited to a high power state while graphics processing unit 204 is in a busy state, graphics processing unit 204 may under perform because the graphics processing unit 204 may have to wait for processor 202 to wake-up from a lower power state before receiving additional data from processor 202. Thus, in response to detection of a busy state of graphics processing unit 204, embedded controller 206 may change or modify power state table 212 to set the power state of processor 202 to a high power state to reduce wake-up times of processor 202 and thereby increase the overall performance of graphics processing unit 204.

As stated above, active pin 214 may indicate, in any suitable manner, that graphic processing unit 204 is inactive. In an embodiment, temperature sensor 210 may detect a temperature associated with graphics processing unit 204 that satisfies the first temperature threshold even if graphics processing unit 204 is inactive based on graphics processing unit 204 remaining warm until it cools off over time. However, embedded controller 206 may perform one or more operations based on graphics processing unit 204 being inactive and the temperature of graphics processing unit 204 satisfying the first temperature threshold. For example, the combination of temperature sensor 210 and embedded controller 206 may periodically monitor the temperature of graphics processing unit 204 and compare the temperature to a second temperature threshold. If the temperature satisfies the second threshold, embedded controller 206 may detect a busy state of graphics processing unit 204 and modify or change the power state table 212 by setting the power state of processor 202 to a high power state as described above.

In an embodiment, the second temperature threshold may be a higher temperature than the first temperature threshold. For example, the first temperature threshold may be a temperature (e.g., six-five degrees Celsius) at which graphics processing unit 204 may transition from inactive to active, and the second threshold may be a temperature (e.g., eighty degrees Celsius) at which graphics processing unit 204 is always active. One skilled in the art would recognize that the exemplary temperatures for the first temperature threshold and the second temperature threshold may vary without changing the scope of the disclosure.

As stated above, embedded controller 206 may set the power state of processor 202 within power state table 212 to a high power state based on a busy state of graphics processing unit 204. In response to the power state being set to the high power state, embedded controller 206 may perform one or more operations to detect whether graphics processing unit 204 remains in the busy state. In an example, embedded controller 206 may monitor active pin 214 to determine whether active pin 214 indicates that graphics processing unit 204 is active or inactive. In response to active pin 214 indicating that graphics processing unit is inactive, embedded controller 206 may continue to periodically monitor active pin 214 and determine how many intervals graphics processing unit 204 remains inactive. In an example, every interval that embedded controller 206 determines graphics processing unit 204 is inactive, embedded controller 206 may increment an inactive count of graphics processing unit 204 and compare the inactive count to an inactive count threshold. If the inactive count satisfies (e.g., is greater than or equal to) the inactive count threshold, embedded controller 204 may detect that graphics processing unit 204 in no longer in a busy state and enable, in any suitable way, power state table 212 to include all possible power states. For example, embedded controller 206 may set the power state for processor 202 to a default power state or lower power state. In an embodiment, the default power state may be any power state including, but not limited to, the restrict use state, the stop clock state, the deep sleep state, the voltage cut state, and the power down state. In an embodiment, changing the power state of processor 202 to the default power state may decrease power consumption by processor 202, which in turn may increase battery life of information handling system 200 while graphics processing unit 204 is not in a busy state.

In an embodiment, during the periodic monitoring of active pin 214 for indications of whether graphics processing unit 204 is active or inactive, the temperature of graphics processing unit 204 may be compare to the second temperature threshold. In an example, upon the temperature of graphics processing unit 204 satisfying the second temperature threshold, embedded controller 206 may perform one or more operations to ensure that the power state for processor 202 within power state table 212 does not change while the temperature of graphics processing unit 204 satisfying the second temperature threshold. For example, embedded controller 206 may compare the temperature of graphics processing unit 204 to the second temperature threshold at periodic intervals to determine whether the temperature drops so that the temperature no longer satisfies the second temperature threshold. In an embodiment, the periodic intervals at which embedded controller 206 compares the temperature of graphics processing unit 204 to the second temperature threshold may be any programmable time value including, but not limited to, 0.9 seconds, 1 second, and 1.1 seconds. In an embodiment, while the temperature of graphics processing unit 204 satisfies the second temperature threshold processor 202 and/or embedded controller 206 may cause cooling fans continue to cool the components of information handling system 200 to ensure that heat generated by graphics processing unit 204 is dissipated.

In response to the temperature of graphics processing unit 204 no longer satisfying the second temperature threshold, embedded controller 204 may set an inactive count of graphics processing unit 204 to zero. Embedded controller 204 may then monitor active pin 214 for an indication of whether graphics processing unit 204 is active or inactive. In response to active pin 214 indicating that graphics processing unit 204 is inactive, temperature sensor 210 and embedded controller 206 may monitor the temperature of graphics processing unit 204 to determine if the temperature no longer satisfies the first temperature threshold.

In an example, in response to the temperature associated with graphics processing unit 204 no longer satisfying the first temperature threshold, embedded controller 204 may detect that graphics processing unit 204 is not in a busy state and may enable, in any suitable way, power state table 212 to include all possible power states. For example, embedded controller 206 may set the power state for processor 202 to the default power state as described above.

In an embodiment, the hysteresis of a busy state for graphics processing unit 204 formed by the first and second temperature threshold may ensure that the power state of processor 202 remains in a high power state until the temperature of graphics processing unit 204 drops below both the second temperature threshold and the first temperature threshold. This hysteresis may increase the performance of graphics processing unit 204 while in the busy state. In an embodiment, when graphics processing unit 204 is not in a busy state processor 202 and/or embedded controller 206 may reduce the speed of cooling fans to reduce acoustic noise generated within information handling system 200.

In an additional or alternative embodiment, the operations described above with respect to embedded controller 206 detecting a busy state of graphics processing unit 204 may be performed by an operating system of processor 202 without varying from the scope of the disclosure. In this embodiment, processor 202 may have access to internal temperatures of graphics processing unit 204 to detect a busy state of graphics processing unit 204 and change a power state in power state table 212 as described above with respect to embedded controller 206.

In an additional or alternative embodiment, embedded controller 206 may receive the temperature of graphics processing unit 204 from any suitable source without varying from the scope of this disclosure. In certain examples, embedded controller 206 may receive the temperature directly from graphics processing unit 204, from temperature sensor 210 as described above, or any other component within information handling system 200.

Figure 3:
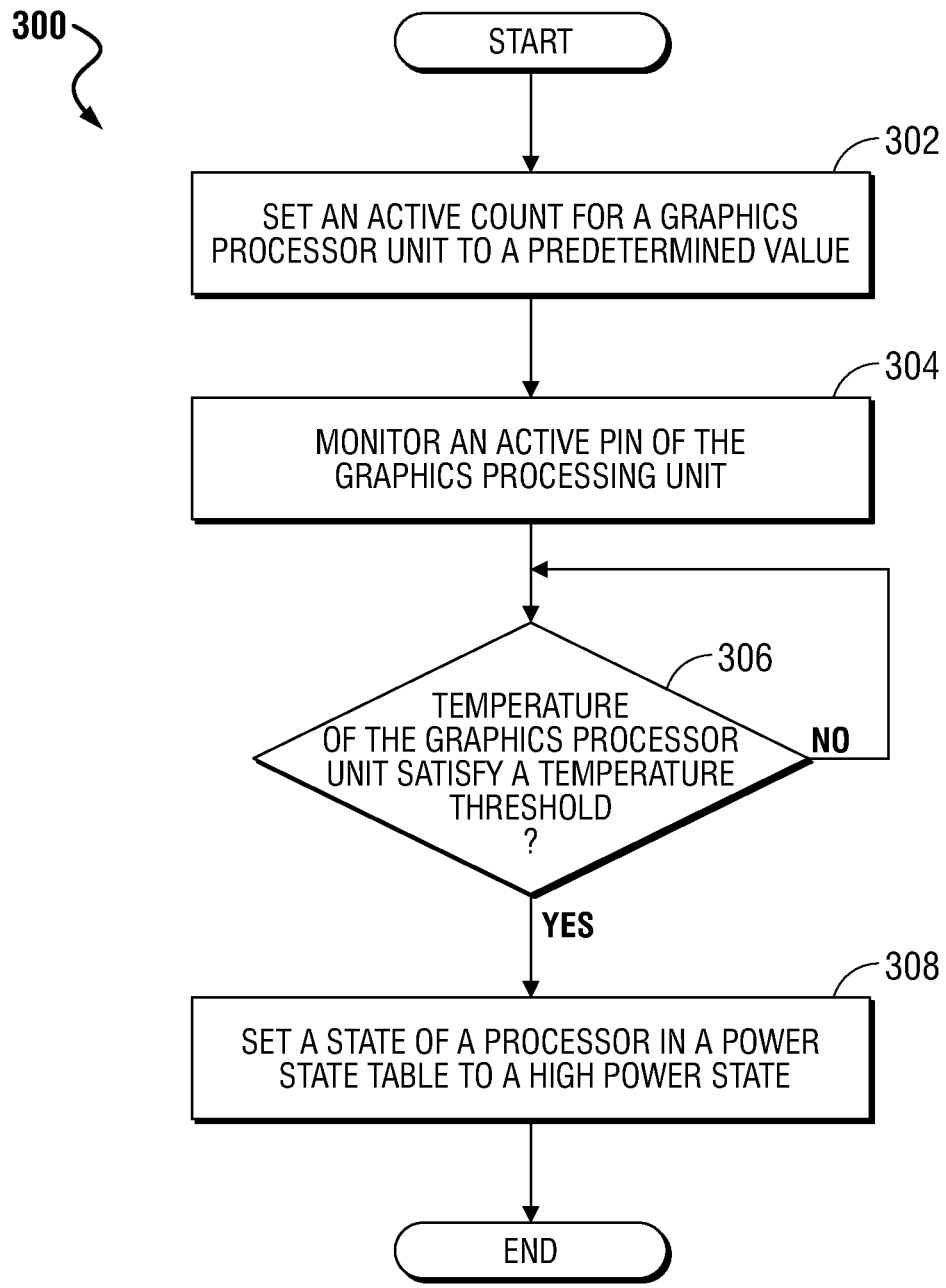
FIG. 3 is a flow diagram illustrating a method of changing a power state within a power state table based on a busy state of a graphics processing unit according to an embodiment of the present disclosure.

FIG. 3 is a flow diagram illustrating a method of changing a power state within a power state table based on a busy state of a graphics processing unit according to an embodiment of the present disclosure. As described herein, under performance of a graphics processing unit may be affected by a delay cause by a processor waking from a sleep power state that the processor entered while the graphics processing unit was rendering images. FIG. 3 provides a method of changing, based on a combination of a temperature of a graphics processing unit and a signal provided on an active pin of the graphics processing unit, a power state of a processor within a power state table to increase the overall performance of a graphics processing unit as compared to a method of only monitoring the active signal to detect a busy state of the graphics processing unit.

At block 302, an active count for a graphics processing unit is set to a predetermined value. Block 302 may be performed in any manner described above. In an example, in response to the start of a process to monitor a busy state of the graphics processing unit, the active count of the graphics processing unit may be set to the predetermined value to indicate that the graphics processing unit is currently not in an active state. In an embodiment, the predetermined value of the active count may be zero. In another embodiment, the predetermined value of the active count may be any number greater than zero without varying from the scope of the disclosure. The predetermined value may be set to zero based on the active count being incremented during periods of activity of the graphics processing unit, and may be set to another value greater than zero based on the active count being decremented during periods of activity of the graphics processing unit.

At block 304, an active pin of the graphics processing unit may be monitored. Block 302 may be performed in any manner described above. For example, the active pin may be monitored to determine an indication of either active or inactive state for the graphics processing unit. In an embodiment, the active count represents an amount of activity (based on detection of an active signal) of the graphics processing unit during a predetermined interval or time period. In an example, the active count is utilized to determine whether activity of the graphics processing unit satisfies a threshold during the predetermined interval, such that a processor may be placed in a high power state to decrease wake-up times of the processor and increase performance of the graphics processing unit. In an embodiment, during time periods of inactivity within the graphics processing unit, an inactive count is incremented to represent an amount of inactivity of the graphics processing unit during a particular time period. In an example, the inactive count is utilized to determine whether a current period of inactivity in the graphics processing unit satisfies a threshold level of inactivity, such that a processor may be placed in a low power state to provide power savings within the information handling system.

At block 306, a determination is made whether a temperature of the graphics processing unit satisfies a temperature threshold. Block 306 may be performed in any manner described above. In an embodiment, the temperature threshold may be a temperature (e.g., six-five degrees Celsius) at which a graphics processing unit, such as graphics processing unit 204 of FIG. 2, may transition from inactive to active. In an example, the temperature of the graphics processing unit is compared to the temperature threshold to remove possible false positive detections of activity of the graphics processing unit that may arise from only monitoring the active pin. Thus, the use of the temperature threshold in combination with the monitoring of the active pin may increase an ability of a system to properly detect a busy state of the graphics processing unit.

In response to the temperature of the graphics processing unit satisfying the temperature threshold, a state of a processor in a power state table is set to a high power state at block 308. Block 308 may be performed in any manner described above. In certain examples, the determination that the temperature satisfies the temperature threshold may indicate that the graphics processing unit is in a busy state (in addition to the monitoring of the active pin), such that a processor may need to stay in a high power state to quickly provide more data for rendering to the graphics processing unit and thereby increase performance of the graphics processing unit. In an embodiment, the high power state may be a power state that may decrease an amount of wake-up time for a processor, such as processor 202 of FIG. 2, which in turn may increase the performance of a graphics processing unit, such as graphics processing unit 204 of FIG. 2, during the busy state.

Figure 4:
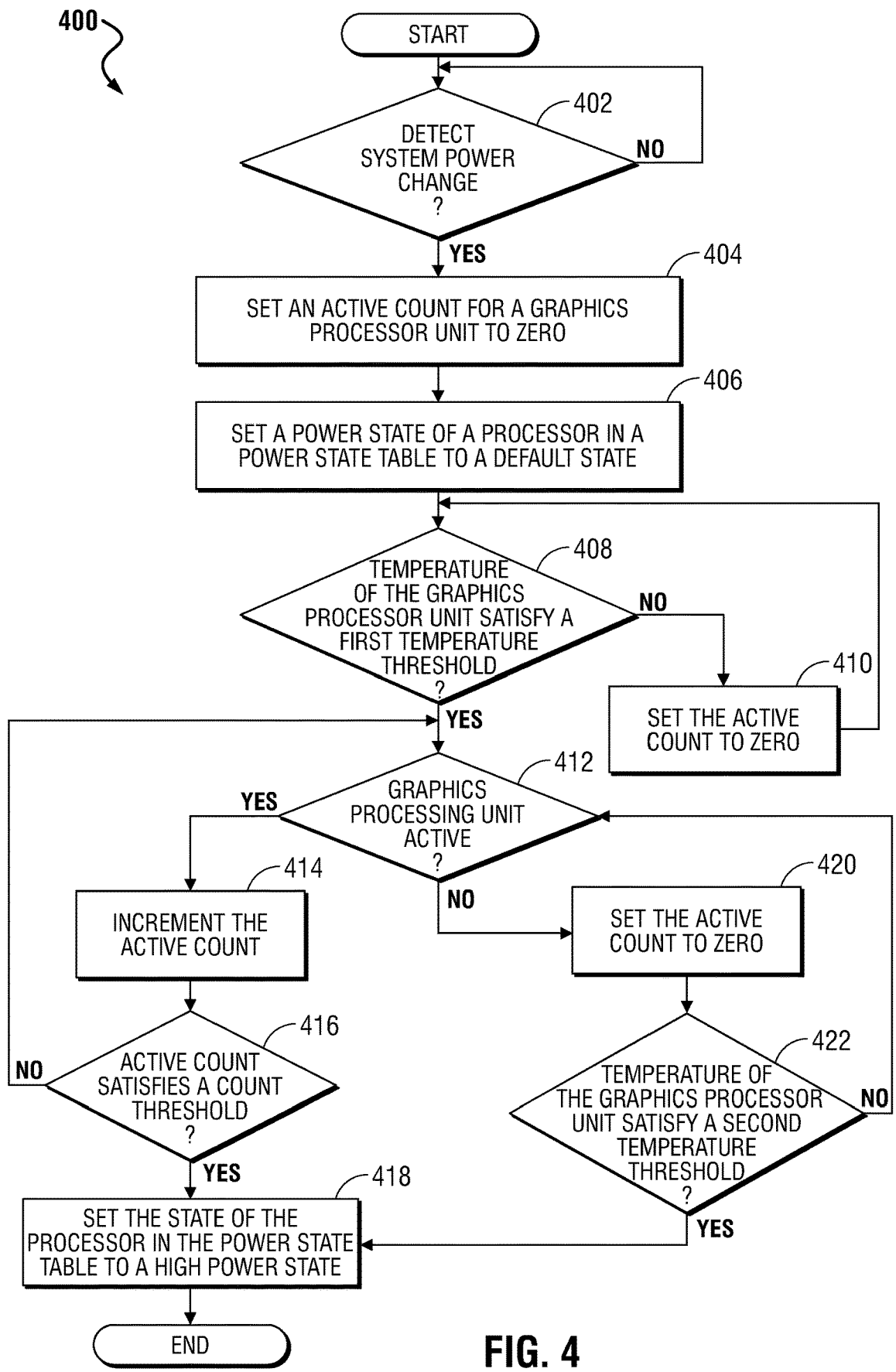
FIG. 4 is a flow diagram illustrating a method of changing a power state within a power state table to a high power stated based on a busy state of a graphics processing unit according to an embodiment of the preset disclosure.

FIG. 4 is a flow diagram illustrating a method 400 of changing a power state within a power state table to a high power stated based on a busy state of a graphics processing unit according to an embodiment of the preset disclosure. As described herein, over performance of a graphics processing unit may be affected by a delay caused by a processor waking from a sleep power state that the processor entered while the graphics processing unit was rendering images. With the method of FIG. 4 a detection of activity or a busy state of a graphics processing unit may be performed using a platform-agnostic hysteresis (e.g., use of temperature and an active signal of a graphics processing unit) to change a power state within a power state table of a processor to increase the overall performance of the graphics processing unit as compared to triggering a power state change only based on an active signal of the graphics processing unit. Additionally, the method may be configured in a platform-specific manner by including configurable temperature thresholds as disclosed herein.

At block 402, a determination is made whether a system power change of an information handling system is detected. Block 402 may be performed in any manner described above. In an example, the system power change of information handling system may include, but is not limited to, a system boot, a system resume operation, removal of alternating current (AC) power from the system, sleep being requested, and AC power being inserted to the system. In an embodiment, during a system power change (e.g., power up of the information handing system) a graphics processing unit will not be in a busy state, such that the process of monitoring a busy state of the graphics processing unit may begin with knowledge that the graphics processing unit is not currently in a busy state.

At block 404, in response to detection of the power change, an active count for a graphics processing unit is set to zero. Block 404 may be performed in any manner described above.

At block 406, a power state of a processor in a power state table is set to a default power state or low power state. Block 406 may be performed in any manner described above. In an embodiment, the default power state may be any power state including, but not limited to, a restrict use state, a stop clock state, a deep sleep state, a voltage cut state, and a power down state. In an example, the default power state of the processor may increase the battery life of the information handling system by reducing power consumption of the processor.

At block 408, a determination is made whether a temperature of the graphics processing unit satisfies a first temperature threshold. Block 408 may be performed in any manner described above. For example, the first temperature threshold may be a temperature (e.g., six-five degrees Celsius) at which a graphics processing unit, such as graphics processing unit 204 of FIG. 2, may transition from inactive to active. In an embodiment, this first temperature threshold is utilized as the start of a temperature hysteresis of the graphics processing unit being in a busy state.

At block 410, in response to the temperature of graphics processing unit not satisfying the first temperature threshold, the active count of the graphics processing unit is set to zero and the flow continues as described above at block 408. Block 410 may be performed in any manner described above. In an embodiment, a delay may exist between completion of block 410 and returning to block 408, which may be any programmable value including, but not limited to, 0.4 seconds, 0.5 seconds, and 0.6 seconds. In an embodiment, the loop between block 408 and 410 may indicate that the processor should remain in a default power state, such as a low power state, while the temperature of the graphics processing unit is below the first temperature threshold.

At block 412, in response to the temperature of graphics processing unit satisfying the first temperature threshold, a determination is made whether graphics processing unit is active. Block 412 may be performed in any manner described above. For example, an active pin of the graphics processing unit may be monitored for a signal indicating whether the graphics processing unit is active or inactive. In an embodiment, there may be different reasons why the temperature associated with the graphics processing unit satisfies the first threshold. For example, the temperature may satisfy the first threshold based on the graphics processing unit being in a busy state (e.g., actively rendering images with a particular consistency over a period of time), another component within the information handling system is heating up a location associated with the graphics processing unit, or the like. In an embodiment, the determination of whether the graphics processing unit is active is performed to verify that the rise in the temperature is based on activity of the graphics processing unit.

At block 414, in response to the graphics processing unit being active, the active count is incremented. Block 414 may be performed in any manner described above. In another embodiment, the active count may be decremented from a high predetermined value in response to the graphics processing unit being active without varying from the scope of this disclosure.

At block 416, a determination is made whether the active count satisfies a count threshold. Block 416 may be performed in any manner described above. In an embodiment, if the active count is incremented (based on the graphics processing unit being active) from zero, then the count threshold may be any value greater than zero. In another embodiment, if the active count is decremented (based on the graphics processing unit being active) from a predetermined number, then the count threshold may be any value less than the predetermined number. If the active count does not satisfy the count threshold, the flow continues as described above at block 412. In an embodiment, a delay may exist between completion of block 416 and returning to block 412, which may be any programmable value including, but not limited to, 0.4 seconds, 0.5 seconds, and 0.6 seconds. In an embodiment, the loop of blocks 412, 414, and 416 may indicate that the processor should remain in a default power state, such as a low power state, while the graphics processing unit is active or warm, but has not been active long enough to place the processor in a high power state.

At block 418, in response to the active count satisfying the count threshold, the state of the processor in the power state table is set to a high power state. Block 418 may be performed in any manner described above. In an example, the active count satisfying the count threshold indicates that the graphics processing unit is in a busy state, and the high power state of the processor may increase performance of the graphics processing unit. In an embodiment, the high power state may be one of a predefined group of power states including, but not limited to, the active state and the auto halt state. In another embodiment, the predefined group of power states may include the active state, the auto halt state, the restrict use state, and the stop clock state. In certain examples, the determination that the graphics processing unit is active and the temperature satisfies the first temperature threshold may indicate that the graphics processing unit is in a busy state, such that a processor may need to stay in a high power state to quickly provide more data for rendering to the graphics processing unit and thereby increase performance of the graphics processing unit. In an embodiment, the high power state may be a power state that may decrease an amount of wake-up time for a processor, such as processor 202 of FIG. 2, which in turn may increase the performance of a graphics processing unit, such as graphics processing unit 204 of FIG. 2, during the busy state.

At block 420, in response to the graphics processing unit not being active, the active count is set to zero. Block 420 may be performed in any manner described above.

At block 422, a determination is made whether a temperature of the graphics processing unit satisfies a second temperature threshold. Block 422 may be performed in any manner described above. If the temperature of the graphics processing unit does not satisfy the second temperature threshold, the flow continues as described above at block 412. In an embodiment, a delay may exist between completion of block 422 and returning to block 412, which may be any programmable value including, but not limited to, 0.4 seconds, 0.5 seconds, and 0.6 seconds. In an embodiment, the loop back to block 412 from block 422 may indicate that the processor should remain in a default power state, such as a low power state, while the graphics processing unit warm but not active. In certain examples, the processor may remain the low power state while the graphics processing unit is not active and the temperature is below the second temperature threshold, because the graphics processing unit does not need the processor to continually provide image data for rendering. In an embodiment, the low power state of the processor may result in power savings within the information handling system, because the processor will be in a sleep state and not use the same amount of power as if in a high power state.

In response to the temperature of the graphics processing unit satisfying the second temperature threshold, the state of the processor in the power state table is set to a high power state at block 418. Block 418 may be performed in any manner described above. In an example, the active count satisfying the count threshold indicates that the graphics processing unit is in a busy state, and the high power state of the processor may increase performance of the graphics processing unit. In certain examples, the determination that the graphics processing unit is satisfies the second temperature threshold may indicate that the graphics processing unit is in a busy state, such that a processor may need to stay in a high power state to quickly provide more data to the graphics processing unit to render images and thereby increase performance of the graphics processing unit. In an embodiment, the second threshold may be a temperature (e.g., eighty degrees Celsius) at which a graphics processing unit, such as graphics processing unit 204 of FIG. 2, is always active so that the processor should be in the high power state. In an embodiment, this second temperature threshold is utilized as the second temperature of the temperature hysteresis of the graphics processing unit being in a busy state, such that when the temperature of the graphics processing unit satisfies the second temperature threshold, the graphics processing unit is determined to be in a busy state without consideration of an active signal on the active pin.

Figure 5:
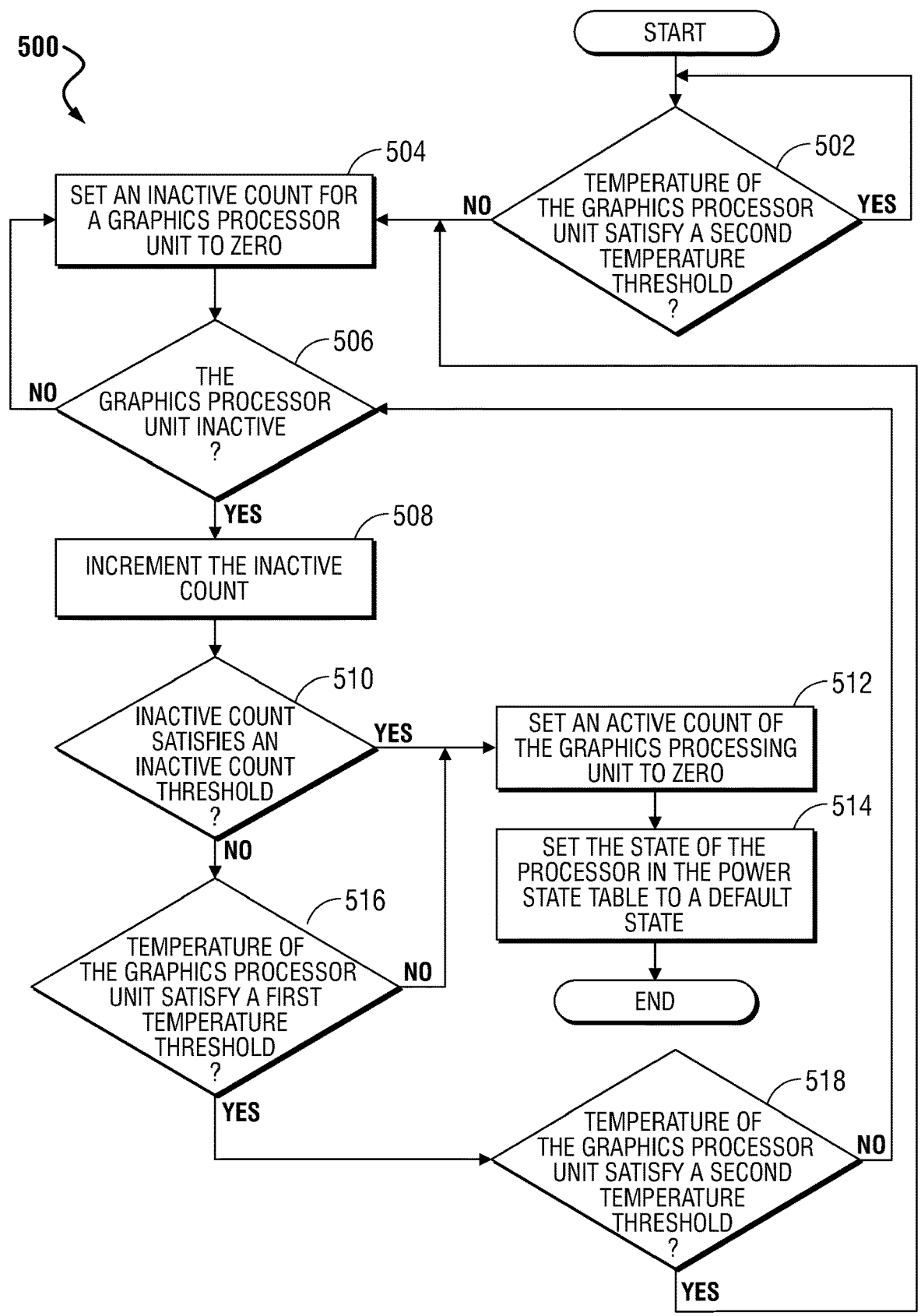
FIG. 5 is a flow diagram illustrating a method of changing a power state within a power state table to a default power state based on a busy state of a graphics processing unit according to an embodiment of the present disclosure.

FIG. 5 is a flow diagram illustrating a method 500 of changing a power state within a power state table to a default power state based on a busy state of a graphics processing unit according to an embodiment of the present disclosure. As described herein, over battery life of an information handling system may be affected by a processor being in a high power state while the graphics processing unit is not in a busy state. FIG. 5 provides a method of changing a power state of a processor within a power state table to a default power state and thereby reduce power usage by the processor based on the temperature of the graphics processing unit and monitoring of an active pin of the graphics processing unit.

At block 502, a determination is made whether a temperature of the graphics processing unit satisfies a second temperature threshold. Block 502 may be performed in any manner described above. In an example, if the temperature of the graphics processing unit does satisfy the second temperature threshold, a delay of a programmable value may be implemented before the determination of block 502 is performed again. In an embodiment, the programmable value may be any value including, but not limited to, 0.9 seconds, 1 second, and 1.1 seconds. In an embodiment, block 502 may be performed after completion of block 424 of FIG. 4. In an embodiment, the loop of block 502 keeps the processor in a high power state until the temperature of graphics processor drops to a cooler temperature.

At block 504, in response to the temperature of the graphics processing unit not satisfying the second temperature threshold, an inactive count for the graphics processing unit is set to zero. Block 504 may be performed in any manner described above. In an example, the inactive count is utilized to determine whether a current period of inactivity in the graphics processing unit satisfies a threshold level of inactivity, such that a processor may be placed in a low power state to provide power savings within the information handling system. In an embodiment, block 504 may be performed in response to the temperature of the graphics processing unit not satisfying the second temperature threshold in block 502. In another embodiment, block 502 may be performed after completion of block 418 of FIG. 4.

At block 506, a determination is made whether the graphics processing unit is inactive. Block 506 may be performed in any manner described above. For example, an active pin of the graphics processing unit may be monitored for a signal indicating whether the graphics processing unit is active or inactive. If the graphics processing unit is active, the flow continues as stated above at block 504. In an embodiment, the loop between block 506 and 504 keeps the processor in a high power state until the graphics processor is inactive.

At block 508, in response to the graphics processing unit being inactive, an inactive count of the graphics processing unit is incremented. Block 508 may be performed in any manner described above. In an example, the inactive count represents a number of cycles that the graphics processing unit has been inactive.

At block 510, a determination is made whether the inactive count satisfies an inactive count threshold. Block 510 may be performed in any manner described above. If the inactive count does not satisfy the inactive count threshold, the graphics processing unit is active enough to keep the processor in a high power state unless not at a high enough temperature threshold at 516 below.

At block 512, in response to the inactive count satisfying the inactive count threshold, an active count of the graphics processing unit is set to zero. Block 512 may be performed in any manner described above.

At block 514, a state of a processor in a power state table is set to a default power state. Block 514 may be performed in any manner described above. In an embodiment, the default power state may be any power state including, but not limited to, a restrict use state, a stop clock state, a deep sleep state, a voltage cut state, and a power down state.

At block 516, a determination is made whether the temperature of the graphics processing unit satisfies the first temperature threshold. Block 516 may be performed in any manner described above. If the temperature of the graphics processing unit does not satisfy the first temperature threshold, the flow continues as stated above at block 512.

At block 518, in response to the temperature of the graphics processing unit satisfying the first temperature threshold, a determination is made whether the temperature of the graphics processing unit satisfies the second temperature threshold. Block 518 may be performed in any manner described above. If the temperature of the graphics processing unit does not satisfy the second temperature threshold, the flow continues as stated above at block 506. If the temperature of the graphics processing unit does satisfy the second temperature threshold, the flow continues as stated above at block 504. In an embodiment, a determination that the temperature of the graphics processing unit does not satisfy the second temperature threshold may indicate that the graphics processing unit is no longer active, which would cause the temperature drop. In this embodiment, the inactive count should be set to zero at block 504 and a determination should be made whether the graphics processing unit is inactive at block 506.

The blocks of the flow diagrams of FIGS. 3-5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
setting an active count to a predetermined value at an embedded controller, wherein the active count is associated with processing cycles of a graphics processing unit of an information handling system;
detecting an active signal on an active pin of the graphics processing unit, wherein the active signal is for each active processing cycle of the graphics processing unit;
modifying the active count based on detection of the active signal on the active pin of the graphics processing unit;
measuring a temperature of the graphics processing unit;
determining, via the embedded controller, that the temperature of the graphics processing unit satisfies a first temperature threshold and the active count meets an active signal count threshold; and
changing, via an instruction from the embedded controller, a state in a power state table to a high power state based on the temperature of the graphics processing unit satisfying the first temperature threshold and the active count meeting the active signal count threshold, wherein the state of the power state table is associated with a central processing unit of the information handling system.

2. The method of claim 1, further comprising:
incrementing the active count of the graphics processing unit when the active signal is provided on the active pin;

determining that the active count satisfies the active signal count threshold; and
changing the state in the power state table to the high power state when the active count satisfies the active signal count threshold.

3. The method of claim 2, further comprising:
setting an inactive count to zero, wherein the inactive count is associated with the graphics processing unit;
determining whether the graphics processing unit is inactive;
incrementing the inactive count in response to the graphics processing unit being inactive;
determining that the inactive count satisfies a threshold inactive count;
setting the active count to zero; and
enabling the state in the power state table to be set to any one of a plurality of possible power states.

4. The method of claim 3, further comprising:
determining that the inactive count does not satisfy the threshold inactive count in a next interval;
determining whether the temperature of the graphics processing unit no longer satisfies the first temperature threshold;
setting the active count to zero when the temperature does not satisfy the first temperature threshold; and
enabling the state in the power state table to be set to any one of a plurality of possible power states.

5. The method of claim 2, further comprising:
setting the active count to zero when the active signal no longer being provided on the active pin;
determining that the temperature of the graphics processing unit satisfies a second temperature threshold; and
changing the state in the power state table to the high power state.

6. The method of claim 5, further comprising:
determining whether the temperature of the graphics processing unit no longer satisfies the second temperature threshold;
setting an inactive count to zero, wherein the inactive count is associated with the graphics processing unit;
determining whether the graphics processing unit is inactive;
incrementing the inactive count in response to the graphics processing unit being inactive;
determining that the inactive count satisfies a threshold inactive count; and
setting the active count to zero; and
enabling the state in the power state table to be set to any one of a plurality of possible power states.

7. The method of claim 2, further comprising:
determining, at a predetermined interval, whether the active signal is provided on the active pin of the graphics processing unit when the active count does not satisfy the active signal count threshold.

8. The method of claim 1, wherein the high power state is selected from a group comprising an operational state and a first idle state.

9. The method of claim 1, further comprising:
determining whether the temperature of the graphics processing unit satisfies the first temperature threshold at predetermined time intervals.

10. An information handling system comprising:
a graphics processing unit, a central processing unit and an embedded controller;
the embedded controller communicatively coupled to the graphics processing unit, the embedded controller configured to execute instructions to:
set an active count to a predetermined value, wherein the active count is associated with the graphics processing unit; and
detect an active signal on an active pin of the graphics processing unit, wherein the active signal is for each active processing cycle of the graphics processing unit and modify the active count based on detection of the active signal on the active pin;
the embedded controller to receive a temperature of the graphics processing unit, and to determine that the temperature of the graphics processing unit satisfies a first temperature threshold; and
the embedded controller to change a state in a power state table to a high power state based on the temperature of the graphics process unit satisfying the first temperature threshold and the active count meeting a count threshold, wherein the state of the power state table is associated with the central processing unit of the information handling system.

11. The information handling system of claim 10, further comprising:
the embedded controller changing the power state table to the high power state is further configured to:
increment the active count of the graphics processing unit; and
determine that the active count satisfies the count threshold and
change the state in the power state table to the high power state.

12. The information handling system of claim 11, further comprising:
the embedded controller, in response to changing the state in the power state table to the high power state based on the active count satisfying the count threshold, configured to:
set an inactive count to zero, wherein the inactive count is associated with the graphics processing unit;
determine whether the graphics processing unit is inactive;
increment the inactive count in response to the graphics processing unit being inactive;
determine whether the inactive count satisfies a threshold inactive count; and
the embedded controller, in response to the inactive count satisfying the threshold inactive count, configured to:
set the active count to zero; and
enable the state in the power state table to be set to any one of a plurality of possible power states.

13. The information handling system of claim 12, further comprising:
the embedded controller, in response to the inactive count not satisfying the threshold inactive count in a next interval, configured to:
determine whether the temperature of the graphics processing unit no longer satisfies the first temperature threshold;
the embedded controller, in response to determining that the temperature no longer satisfies the first temperature threshold, configured to:
set the active count to zero; and
enable the state in the power state table to be set to any one of a plurality of possible power states.

14. The information handling system of claim 11, further comprising:

the embedded controller, in response to the active signal no longer being provided on the active pin, configured to:
set the active count to zero;
determine that the temperature of the graphics processing unit satisfies a second temperature threshold; and
the embedded controller, in response to the temperature of the graphics processing unit satisfying the second temperature threshold, configured to:
maintain the state in the power state table to the high power state.

15. The information handling system of claim 14, further comprising:
the embedded controller, in response to changing the state in the power state table to the high power state based on the temperature of the graphics processing unit satisfying the second temperature threshold, configured to:
determine that the temperature of the graphics processing unit no longer satisfies the second temperature threshold;
the embedded controller, in response to the temperature of the graphics processing unit no longer satisfying the second temperature threshold, configured to:
set an inactive count to zero, wherein the inactive count is associated with the graphics processing unit;
determine whether the graphics processing unit is inactive;
increment the inactive count in response to the graphics processing unit being inactive;
determine that the inactive count satisfies a threshold inactive count; and the embedded controller, in response to the inactive count satisfying the threshold inactive count, configured to:
set the active count to zero; and
enable the state in the power state table to be set to any one of a plurality of possible power states.

16. The information handling system of claim 11, wherein the embedded controller is configured to
determine, at a predetermined interval, that the active signal is provided on the active pin of the graphics processing unit when the active count does not satisfy the active signal count threshold.

17. The information handling system of claim 10, wherein the high power state is selected from a group comprising an operational state and a first idle state.

18. The information handling system of claim 10, wherein the embedded controller is configured to determine whether the temperature of the graphics processing unit satisfies the first temperature threshold is performed at predetermined time intervals.

19. A method comprising:
determining, via an embedded controller, that a temperature of a graphics processing unit satisfies a first temperature threshold;
determining, via the embedded controller, on a first periodic interval that an active signal is provided by the graphics processing unit on an active pin of the graphics processing unit;
incrementing an active count of the graphics processing unit based on the active signal provided on the active pin;
determining that the incremented active count satisfying a count threshold, and
changing a power state table of a central processing unit to a high power state based on the temperature of the graphics processing unit satisfies the first temperature threshold and the active count satisfies the count threshold; and
determining, via the embedded controller, that the active signal is not being provided on the active pin in a next periodic interval and setting the active count to zero based on the active signal not being provided on the active pin;
determining, via the embedded controller, that the temperature of the graphics processing unit satisfies a second temperature threshold, and
maintaining the state in the power state table to the high power state based on the temperature of the graphics processing unit satisfies the second temperature threshold.

20. The method of claim 19, further comprising:
determining whether the temperature of the graphics processing unit satisfies the first temperature threshold at predetermined time intervals.

\* \* \* \* \*